United States Patent
Tai

(10) Patent No.: US 6,920,258 B2
(45) Date of Patent: Jul. 19, 2005

(54) OPTICAL SWITCH

(75) Inventor: Shu Lin Tai, San Jpse, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 280 days.

(21) Appl. No.: 10/264,656

(22) Filed: Oct. 3, 2002

(65) Prior Publication Data

US 2004/0067008 A1 Apr. 8, 2004

(51) Int. Cl.[7] .............................................. G02B 6/28
(52) U.S. Cl. ............................................ 385/16; 385/33
(58) Field of Search ........................... 385/16, 20, 33, 385/36

(56) References Cited

U.S. PATENT DOCUMENTS

| | | | | |
|---|---|---|---|---|
| 4,879,479 A | * | 11/1989 | Frazier et al. ............... | 359/326 |
| 5,276,747 A | * | 1/1994 | Pan .............................. | 385/34 |
| 5,381,250 A | * | 1/1995 | Meadows ..................... | 349/196 |
| 5,724,165 A | * | 3/1998 | Wu ............................... | 398/55 |
| 5,740,288 A | * | 4/1998 | Pan .............................. | 385/11 |

* cited by examiner

*Primary Examiner*—Daniel Stcyr
(74) *Attorney, Agent, or Firm*—Wei Te Chung

(57) ABSTRACT

An optical switch (10) in accordance with the present invention includes a first PBS (101), a second PBS (104), two reflective elements (102, 105) and two liquid crystal elements (103, 106). The first PBS splits input light into two polarized beams, said two beams being orthogonally polarized with respect to each other. The two beams each respectively pass through a different liquid crystal element and a reflective element. The polarization state of the passed beams can be controlled by the electrified or unelectrified state of the liquid crystal elements. The two beams are combined into one output beam by the second PBS, and are outputted from a selected output port (13, 14) depending on the state of electrification of the liquid crystal elements.

11 Claims, 6 Drawing Sheets

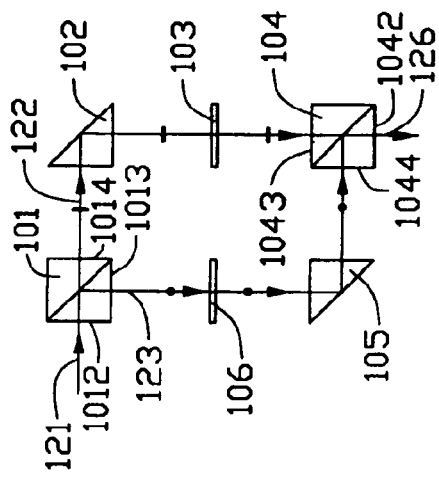
FIG. 2a
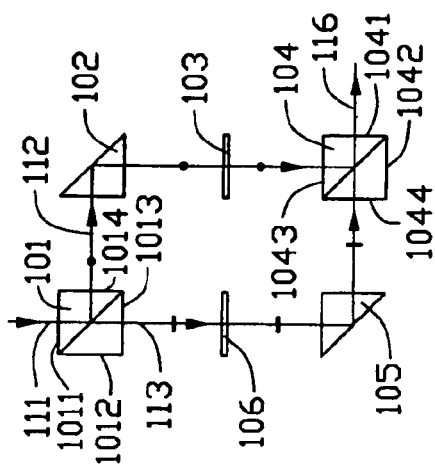
FIG. 2b
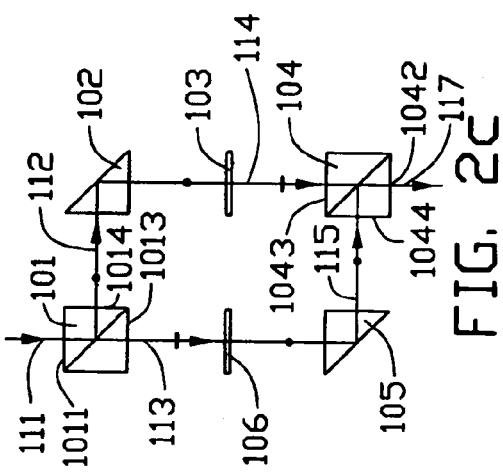
FIG. 2c
FIG. 2d

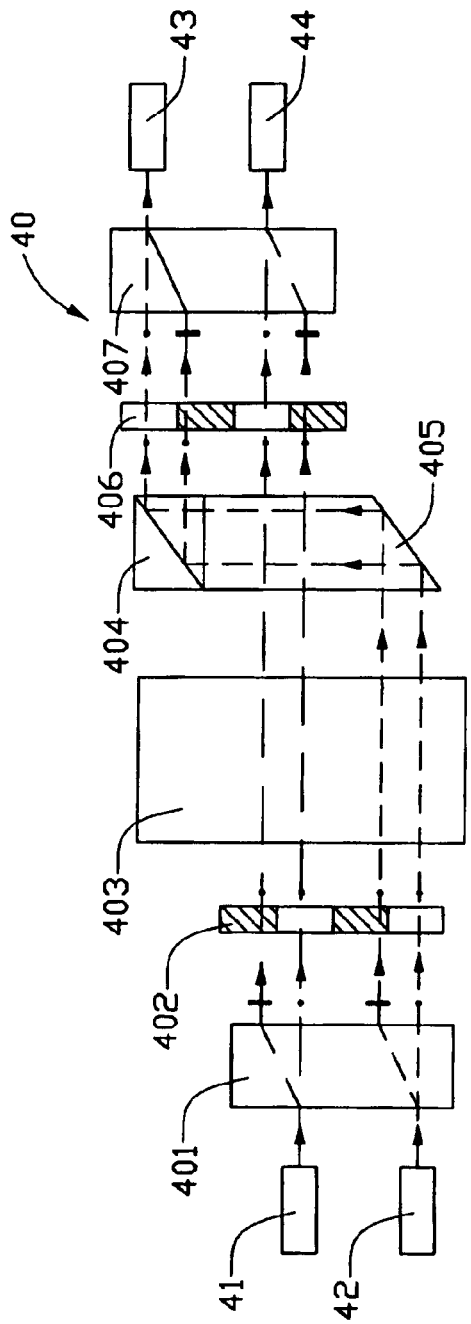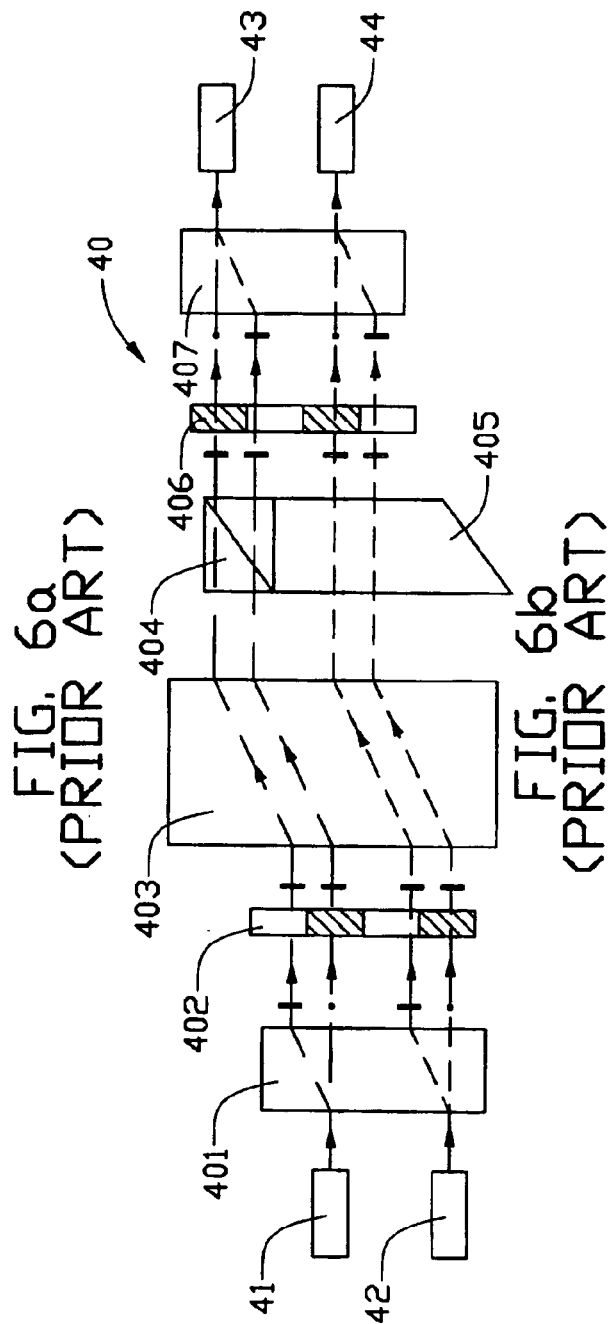
FIG. 6a (PRIOR ART)
FIG. 6b (PRIOR ART)

OPTICAL SWITCH

BACKGROUND OF THE INVENTION

1. Field of the Invention

The present invention generally relates to optical switches used in optical communications, and more particularly to a non-mechanical optical switch.

2. Description of Prior Art

For purposes of convenience and economy, it is often desirable to employ switches in optical networks, so that either a single optical signal can be shared between two or more users or a single user can choose from a variety of optical signals without the added expense and complexity of installing additional hardware.

Optical switches can be classified as mechanical optical switches or as non-mechanical optical switches. Mechanical optical switches realize changes in lightpaths by moving optical fibers or elements using principles of mechanics or electromagnetism.

Referring to FIGS. 6a and 6b, U.S. Pat. No. 5,724,165 discloses a conventional optical switch 40 which includes two input ports 41, 42, three birefringent elements 401, 403, 407, two polarization rotator arrays 402, 406, a polarization beamer splitter (PBS) 404, a prism 405 and two output ports 43, 44. The optical switch 40 realizes optical switching by rotating the two polarization rotator arrays 402, 406. Particularly referring to FIG. 6a, when the two polarization rotator arrays 402, 406 are in a first state, input light from the first input port 41 successively transmits through the first birefringent element 401, the first polarization rotator array 402, the second birefringent element 403, the prism 405, the second polarization rotator array 406 and the third birefringent element 407, and outputs through a second output port 44. Input light from the second input port 42 successively transmits through the first birefringent element 401, the first polarization rotator array 402, the second birefringent element 403, the prism 405, the PBS 404, the second polarization rotator array 406 and the third birefringent element 407, and outputs through a first output port 43. Referring to FIG. 6b, the two polarization rotator arrays 402, 406 are in a second state, and input light from the first input port 41 successively transmits through the first birefringent element 401, the first polarization rotator array 402, the second birefringent element 403, the PBS 404, the second polarization rotator array 406 and the third birefringent element 407, and outputs through the first output port 43. Input light from the second input port 42 successively transmits through the first birefringent element 401, the first polarization rotator array 402, the second birefringent element 403, the prism 405, the second polarization rotator array 406 and the third birefringent element 407, and outputs through the second output port 44.

However, the conventional optical switch has many shortcomings. First, the optical switch 40 realizes optical switching by rotating the polarization rotator arrays 402, 406, and thus complex mechanical mechanisms are required for working the optical switch 40. Second, the optical switch 40 has degraded optical performance, including a large optical attenuation, since the light has to pass through too many optical elements in traveling from the input port to the output port.

An optical switch having good optical performance which requires no moving optical elements is desired.

SUMMARY OF THE INVENTION

Accordingly, an object of the present invention is to provide an optical switch having good optical performance, which has no moving optical elements.

To achieve the above object, an optical switch in accordance with the present invention includes a first PBS, a second PBS, two reflective elements and two liquid crystal elements. The first PBS splits input light into two linearly polarized beams, said two beams being perpendicular to each other. The two beams respectively pass through a different liquid crystal element and a different reflective element. The polarization state of the transmitted beams can be controlled by the liquid crystal elements. The two beams are combined into one beam by the second PBS, the said beam outputting through a selected output port depending on the state of the liquid crystal elements.

BRIEF DESCRIPTION OF THE DRAWINGS

Other objects, advantages and novel features of the present invention will be drawn from the following detailed description of a preferred embodiment of the present invention with attached drawings, in which:

FIGS. 2a–2d are schematic diagrams showing different light paths through the optical switch of FIG. 1;

FIGS. 6a–6b are schematic diagrams showing light paths in a conventional optical switch.

DETAILED DESCRIPTION OF PREFERRED EMBODIMENT

Figure 1:
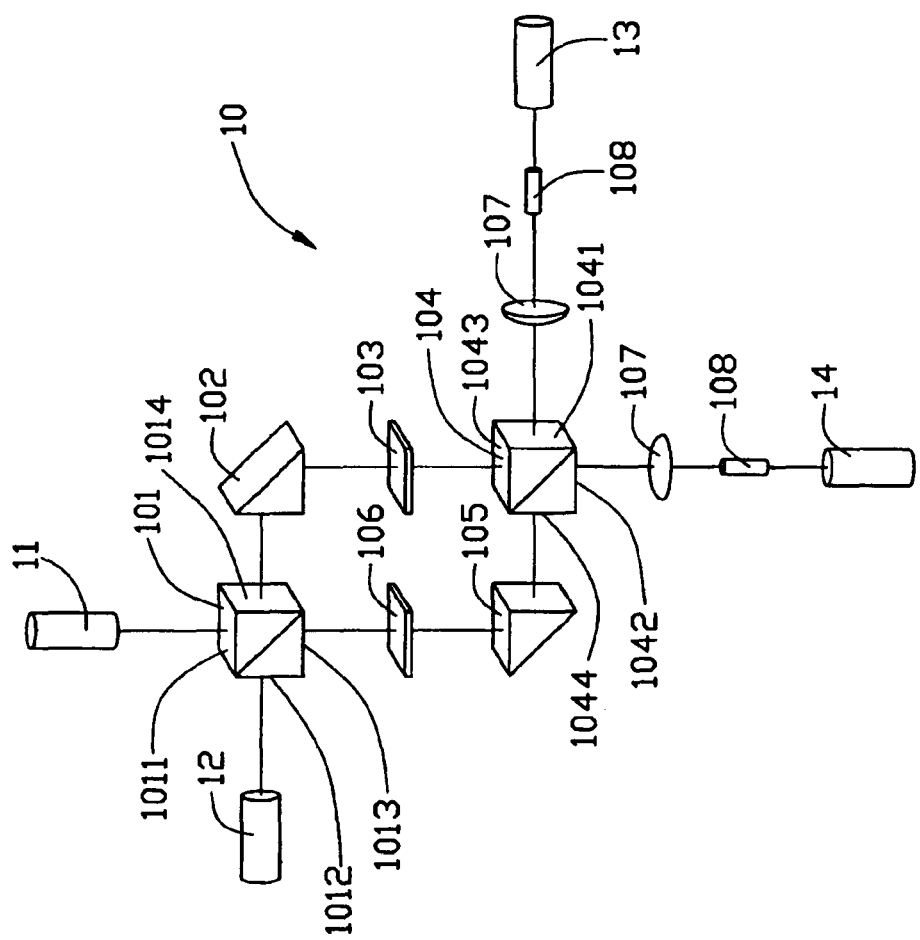
FIG. 1 is a schematic diagram of an optical switch in accordance with a first embodiment of the present invention.

Referring to FIG. 1, an optical switch 10 in accordance with a first embodiment of the present invention comprises a first polarization beam splitter (PBS) 101, a first liquid crystal element 103, a second liquid crystal element 106, a first triangle prism 102, a second triangle prism 105 and a second PBS 104. The optical switch 10 selectively transmits input light from input ports 11, 12 to output ports 13, 14.

The first PBS 101 of the optical switch 10 is used for splitting input light into two linearly polarized beams, and the second PBS 104 is for combining the two linearly polarized beams into one output light beam. The first PBS 101 comprises two triangular portions glued together, and the second PBS 104 is identical to the first PBS 101. Each PBS 101, 104 is made of BK7, SF5 or another glass material, the surfaces of which are coated with anti-reflection film for improving optical performance of the PBSs 101, 104. When light is incident on the first PBS 101, it is split into a vertically and a horizontally polarized beams at the glued interface of the PBS 101. The vertically polarized beam is reflected at the glued surface, and the horizontal polarized beam passes through the glued surface. The two beams, one horizontally polarized, one vertically polarized, respectively output from two different surfaces of the PBS 101. When the vertically and the horizontally polarized beams are incident on the second PBS 104 from two predetermined directions, the vertically polarized beam is reflected at the glued surface, and combines with the transmitted horizontally polarized beam into one output beam.

Liquid crystal elements 103, 106 of the optical switch 10 are electrically connected with a control center (not shown).

The control center controls an electrical state of the liquid crystal elements 103, 106, thus controlling the polarization state of transmitted polarized light beams. When the liquid crystal element is in an "on" state, that is, in an electrified state, the polarization state of polarized light beams is unchanged by passing through the liquid crystal element. When the liquid crystal element is in an "off" state, that is, in an unelectrified state, the polarization state of polarized light beams is changed by passing through the liquid crystal element, that is, vertically polarized light changes to horizontally polarized light, and horizontally polarized light changes to vertically polarized light.

The optical switch 10 in accordance with a first embodiment of the present invention has the first PBS 101, the first triangle prism 102, the second PBS 104 and the second triangle prism 105, arranged in that order, at four vertexes of a rectangle. The first liquid crystal element 103 is located between the second PBS 104 and the first triangle prism 102, and the second liquid crystal element 106 is located between the first PBS 101 and the second triangle prism 105. The first and second input ports 11, 12 are respectively opposite a first and second surfaces 1011, 1012 of the first PBS 101, and the first and second output ports 13, 14 are respectively opposite a first and second surfaces 1041, 1042 of the second PBS 104. Input light beams from the input ports 11, 12 pass through the optical switch 10, and selectively transmit to the output ports 13, 14. In order to ensure that light beams from the second PBS 104 are precisely transmitted to the output ports 13, 14, a collimator subassembly (not labeled) with a collimating lens 107 and a GRIN lens 108 is positioned between the second PBS 104 and each output port 13, 14.

Referring to FIGS. 2a–2d, optical paths through the optical switch 10 are disclosed. Particularly referring to FIGS. 2a and 2b, the optical switch 10 is shown in a first state, that is, the liquid crystal elements 103, 106 are in an electrified state. A first input light beam 111 from the first input port 11 transmits through the first surface 1011 of the first PBS 101, and is split into a first and second polarized beams 112, 113. The first polarized beam 112 is vertically polarized, and the second polarized beam 113 is horizontally polarized. The first polarized beam 112 is output through a fourth surface 1014 of the first PBS 101, and is successively transmitted through the first triangle prism 102 and the first liquid crystal element 103. Since the first liquid crystal element 103 is in an electrified state, the polarization state of the first polarized beam 112 is unchanged after transmitting through the first liquid crystal element 103, and the first polarized beam 112 is still a vertically polarized beam, which is transmitted through a third surface 1043 of the second PBS 104. In the same manner, the second polarized beam 113 is output through a third surface 1013 of the first PBS 101, and successively passes through the second liquid crystal element 106 and the second triangle prism 105. The polarization state of the second polarized beam 113 is unchanged, and the transmitted polarization beam 113 is still a horizontally polarized beam when it is incident on a fourth surface 1044 of the second PBS 104. The two polarized beams 112, 113 are combined into a first output beam 116 in the second PBS 104, said first output beam 116 being output through the first surface 1041 of the second PBS 104, and being transmitted to the first output port 13. In the same manner, a second input light beam 121 from the second input port 12 is split into a vertically polarized second beam 123 and a horizontally polarized first beam 122 by the first PBS 101. The two polarized beams 122, 123 respectively pass through the liquid crystal elements 103, 106, and the polarized state of the two beams 122, 123 is unchanged. Then, the two unchanged beams 122, 123 transmit to the second PBS 104 and are combined into a second output beam 126, said second output beam 126 being output through the second surface 1042 of the second PBS 104, and transmitting to the second output port 14.

Referring to FIGS. 2c–2d, the optical switch 10 is shown in a second state, wherein, the liquid crystal elements 103, 106 are in an unelectrified state. A first input light beam 111 from the first input port 11 transmits through the first surface 1011 of the first PBS 101, and is split into a first and second polarized beams 112, 113. The first polarized beam 112 is vertically polarized, and the second polarized beam 113 is horizontally polarized. The first polarized beam 112 is transmitted through the fourth surface 1014 of the first PBS 101, and successively transmits through the first triangle prism 102 and the first liquid crystal element 103. Since the first liquid crystal element 103 is in an unelectrified state, the polarization state of the first polarized beam 112 is changed after passing through the first liquid crystal element 103, that is, the first polarized beam 112 becomes a horizontally polarized beam 114, and is transmitted to the third surface 1043 of the second PBS 104. In the same manner, the second polarized beam 113 is transmitted through the third surface 1013 of the first PBS 101, and successively passes through the second liquid crystal element 106 and the second triangle prism 105. The polarization state of the second polarized beam 113 is changed, that is, the second polarized beam 113 becomes a vertically polarized beam 115 which is incident on the fourth surface 1044 of the second PBS 104. The two polarized beams 114, 115 are combined into a second output beam 117 in the second PBS 104, said second output beam 117 being transmitted through the second surface 1042 of the second PBS 104, and being transmitted to the second output port 14. In the same manner, the second input light beam 121 from the second input port 12 is split into a horizontally polarized first beam 122 and a vertically polarized second beam 123 by the first PBS 101. The two polarized beams 122, 123 respectively pass through the liquid crystal elements 103, 106, and the two beams 122, 123 are respectively changed to a vertically polarized first beam 124 and a horizontally polarized second beam 125. Then, the two polarized beams 124, 125 are transmitted through the second PBS 104 and are combined into a first output beam 127, said first output beam 127 being output from the first surface 1041 of the second PBS 104, and transmitting to the first output port 13.

Figure 3:
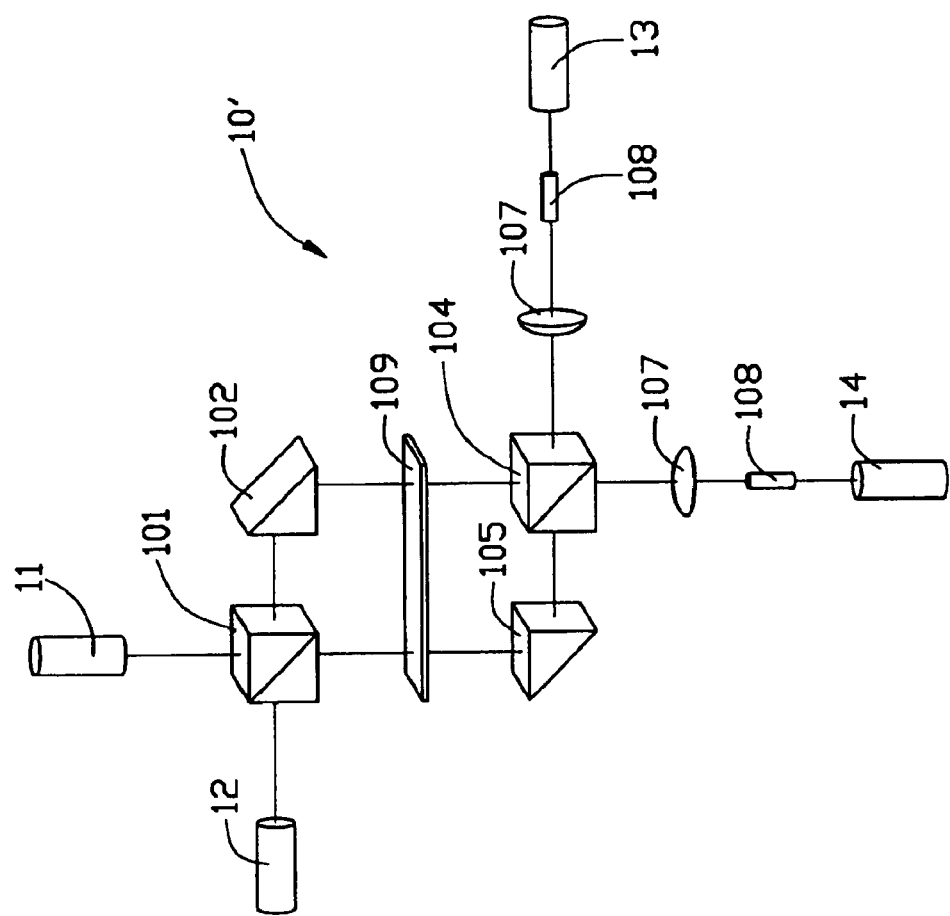
FIG. 3 is a schematic diagram of an optical switch in accordance with a second embodiment of the present invention.

Referring to FIG. 3, a second embodiment of an optical switch 10' of the present invention is disclosed. The optical switch 10' is substantially identical to the optical switch 10 of the first embodiment of the present invention, but the two liquid crystal elements 103, 106 are replaced by a liquid crystal element 109 to realize optical switching.

Figure 4:
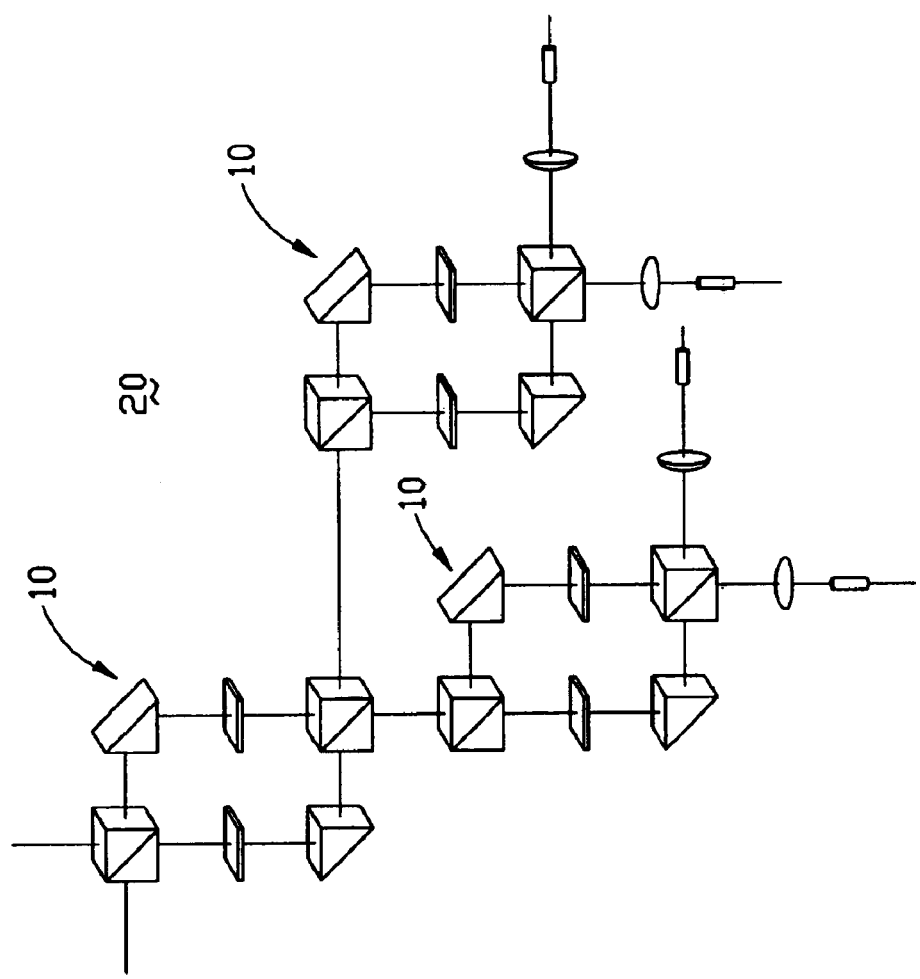
FIG. 4 is a schematic diagram of an optical switch assembly assembled from several optical switches of FIG. 1.

Referring to FIG. 4, a plurality of optical switches 10 are assembled in an optical switch assembly 20 to increase the number of output ports. The optical switch assembly 20 has two input ports and four output ports, and comprises a first stage optical switch 10 and two second stage optical switches 10. Output light beams of the first stage optical switch 10 serve as input light beams to the second stage optical switches 10. The optical switch assembly 20 can also be assembled using a plurality of optical switches 10'. It is obvious that more optical switches 10 (10') can be connected in the optical switch assembly 20 to further increase the number of output ports.

Figure 5:
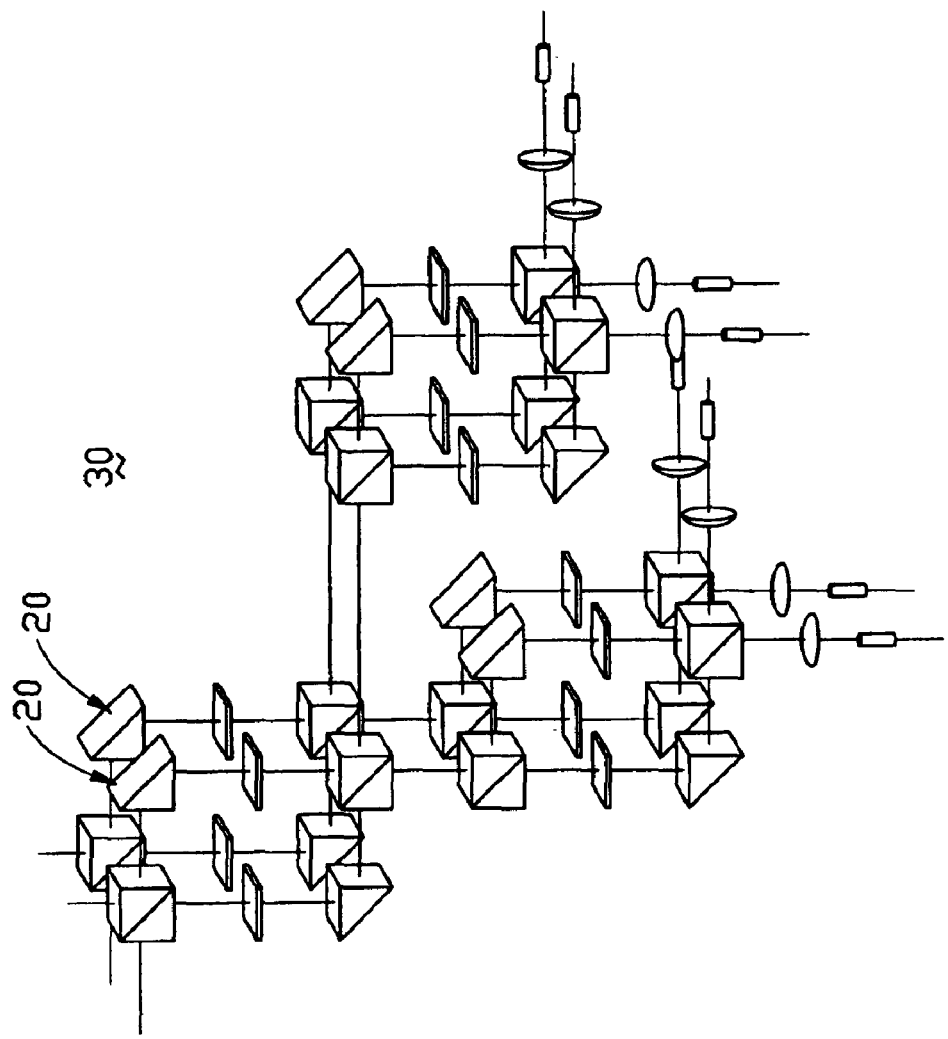
FIG. 5 is a schematic diagram of a multi-array optical switch assembly made from a plurality of optical switch assemblies of FIG. 4.

Referring to FIG. 5, a plurality of optical switch assemblies 20 are assembled in a multi-array optical switch assembly 30 to increase the number of input and output ports. The multi-array optical switch assembly 30 shown comprises two optical switch assemblies 20 and has four input ports and eight output ports.

It is obvious that the liquid crystal elements 103, 106 of the optical switch 10 can be located in different places. For instance, the first liquid crystal element 103 can be located between the first PBS 101 and the first triangle prism 102, and the second liquid crystal element 106 can be located between the second PBS 104 and the second triangle prism 105. Also, they can be joined as one piece as long as confront both the two split light beams. Furthermore, the triangle prisms 102, 105 can be replaced by other optical elements or optical guide elements which can realize a change in optical path direction.

Compared with convention optical switches, the optical switches 10 (10') in accordance with the present invention realize optical switching by using liquid crystal elements and require no movement of optical elements. Thus, the switching process is simple. Secondly, light beams passing through the optical switches 10 (10') pass through fewer optical elements, and thus the optical performance of the optical switches is improved.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. An optical switch comprising:

a first input port;

a first polarization beam splitter receiving light signals from the first input port and splitting the light signals into a first and a second polarized beams, said two beams having orthogonal polarizations with respect to each other; a liquid crystal element changeable between a first and second states;

a second polarization beam splitter; and a first and second output ports adjacent the second polarization beam splitter, wherein, the first and second polarized beams from the first polarization beam splitter respectively pass through the liquid crystal element and reach the second polarization beam splitter and the second polarization beam splitter combines the two polarized beams from the liquid crystal element into an output beam and outputs the output beam to an output port, and when the liquid crystal element is in a first state, input light from the first input port is transmitted to the first output port, and when the liquid crystal element is in a second state, input light from the first input port is transmitted to the second output port, two collimating subassemblies respectively located between the second polarization beam splitter and each output port, wherein each collimating subassembly includes a collimating lens and a GRIN lens, the collimating lens is adjacent to the second polarization beam splatter for collimating light transmitted from the second polarization beam splatter to the corresponding GRIN lens, and the GRIN lens is adjacent to the corresponding output port for directing light from the collimating lens to the output port.

2. The optical switch in accordance with claim 1, further comprising a second input port which couples to the first polarization beam splitter, wherein when the liquid crystal element is in a first state, light signals from the second input port are transmitted to the second output port, and when the liquid crystal element is in a second state, light signals from the second input port are transmitted to the first output port.

3. The optical switch in accordance with claim 1, further comprising two triangle prisms located between the first and second polarization beam splitters for changing directions of optical paths of polarized beams from the first polarization beam splitter.

4. The optical switch in accordance with claim 1, wherein the first and second polarization beam splitters are made of BK7, SF5 or other optical material, and are coated with a film for improving optical performance.

5. The optical switch in accordance with claim 1, wherein the first and second states of the liquid crystal element respectively correspond to electrified and unelectrified states.

6. The optical switch in accordance with claim 5, wherein the liquid crystal element is connected to a control center which controls the electrified state of the liquid crystal element.

7. An optical switch with an input port and a first and second output ports, comprising:

a first polarization beam splitter receiving light signals from the input port and splitting the light signals into a first and a second polarized beams, said two beams having orthogonal polarizations with respect to each other;

two liquid crystal elements changeable between a first and second states;

a second polarization beam splitter coupling to the two output ports;

wherein, the first and second polarized beams from the first polarization beam splitter respectively pass through said two liquid crystal elements and reach the second polarization beam splitter, and when the liquid crystal elements are in the first state, the second polarization beam splitter combines the two polarized beams into a first output light beam which transmits to the first output port, and when the liquid crystal elements are in the second state, the second polarization beam splitter combines the two beams into a second output light beam which transmits to the second output port; and two collimating subassemblies respectively located between the second polarization beam splitter and each output port, wherein each collimating subassembly includes a collimating lens arid a GRIN lens, the collimating lens being adjacent to the second polarization beam splitter for collimating light from the second polarization beam splitter to the corresponding GRIN lens, and the GRIN lens being adjacent to the corresponding output port for directing light from the collimating lens to the output port.

8. The optical switch in accordance with claim 7, further comprising two optical direction-changing elements located between the first and second polarization beam splitters for directing optical paths of the first and second polarized beams from the first polarization beam splitter to the second polarization beam splitter.

9. The optical switch in accordance with claim 7, wherein the first and second polarized beams exchange their polarizations with each other when said two liquid crystal elements are in the second state, while not in the first state.

10. An optical switch comprising:

a first and second input port;

a first polarization beam sputter adjacent the input ports, receiving a first and a second light signals from the first and second input ports, respectively, and splitting the light signals into a first and a second beams, the first beam comprising a vertical polarized portion of the first light signal from the first input port and a horizontal polarized portion of the second light signal from the second input port, the second beam comprising a horizontal polarized portion of the first light signal and a vertical polarized portion of the second light signal;

at least a liquid crystal element ewe changeable between an electrified and an unelectrified states; a second polarization beam splitter;

at least two optical path changing devices located between the first and second polarization beam splitters; and a first and second output ports adjacent the second polarization beam splitter, wherein, said first and second beams from the first polarization beam sputter respectively pass through the at least a liquid crystal element and one of the optical path changing devices, and reach the second polarization beam splitter, and the second polarization beam splitter combines the polarized portions of the first and second beams into two output light beams which respectively output to a different output port, and when the liquid crystal element is in the electrified state, the first input light signals from the first input port are transmitted to the first output port, and the second input light signals from the second input port are transmitted to the second output port, and when the liquid crystal element is in the unelectrified state, the first input light signals from the first input port are transmitted to the second output port, and the second input light signals from the second input port are transmitted to the first output port; and two collimating subassemblies respectively located between the second polarization beam splitter and each output port, wherein each collimating subassembly includes a collimating lens arid a GRIN lens, the collimating lens being adjacent to the second polarization beam splitter for collimating light from the second polarization beam splitter to the corresponding GRIN lens, and the GRIN lens being adjacent to the corresponding output port for directing light from the collimating lens to the output port.

11. An optical switch assembly comprising:

a first stage optical switch; and two second stage optical switches; wherein each optical switch comprises: two input ports; a first polarization beam splitter adjacent the two input ports, a second polarization beam splitter;

at least a liquid crystal element located between the first and second polarization beam splitters, the liquid crystal element being agile changeable between an electrified and an unelectrified states;

two output ports adjacent the second polarization beam splitter;

wherein, said output ports of the first stage optical switch are respectively connected to an input port of a different second stage optical switch, wherein each optical switch further comprises two triangle prisms located between the first and second polarization beam splitters.

* * * * *